United States Patent

Scheer

[15] 3,646,557

[45] Feb. 29, 1972

[54] APPARATUS FOR DISPLAYING DISTANCE REFERENCE MARKS ON A RADAR SCREEN

[72] Inventor: Kurt Scheer, Bremen, Germany

[73] Assignee: Fried. Krupp. Gesellschaft mit beschrankter Halftung, Essen, Germany

[22] Filed: July 10, 1969

[21] Appl. No.: 840,656

[30] Foreign Application Priority Data

July 23, 1968 Germany.....................P 17 73 894.2

[52] U.S. Cl...........................343/13 R, 343/5 EM, 343/11 R
[51] Int. Cl..............................................................G01s 7/22
[58] Field of Search...........................343/5 EM, 5 PP, 11, 13

[56] References Cited

UNITED STATES PATENTS

| 2,433,385 | 12/1947 | Miller | 343/13 X |
| 2,857,591 | 10/1958 | Nagel | 343/13 |
| 2,975,413 | 3/1961 | Landee et al. | 343/5 E X |

FOREIGN PATENTS OR APPLICATIONS 349,309  11/1960  Switzerland.......................343/5 E X

*Primary Examiner*—Malcolm F. Hubler
*Attorney*—Spencer & Kaye

[57] ABSTRACT

Apparatus for simultaneously producing an adjustable distance reference mark and fixed distance reference marks on the display device of a reflected-beam position-finding system. The apparatus includes a pulse generator for producing timing pulses, a pulse counter for counting the timing pulses and producing a digital output indicative of the count, a manually adjustable selector for producing a marking pulse each time the counter produces a digital output indicative of a particular preselected count and means for producing further marking pulses each time the counter produces a digital output indicative of a particular fixed count. The marking pulses produced are employed to cause the display device to display a mark indicative of a particular preselected distance and marks indicative of particular fixed distances.

8 Claims, 3 Drawing Figures

Inventor:
Kurt Scheer
By: Spencer & Kaye
Attorneys

APPARATUS FOR DISPLAYING DISTANCE REFERENCE MARKS ON A RADAR SCREEN

BACKGROUND OF THE INVENTION

The present invention relates to apparatus for producing an adjustable reference or scale mark on the screen of a position-finding system (e.g., sonar or radar) which operates according to the reflected beam principle.

Apparatus for producing an adjustable scale mark on the screen of a display device (e.g., a cathode-ray tube) of a radar system is known in the art. This prior art apparatus comprises a time delay pulse source which is triggered by the transmission of a radar beam pulse. Such time delay pulse sources have employed adjustably analog delay circuits which have the disadvantage of limited accuracy due to the unavoidable tolerances and the temperature-dependent behavior of electrical circuit elements. Although the official standards of accuracy (normally ±1 percent) may be achieved with these devices, even this magnitude of error always leads, in practice, to annoying deviations between the positions of the adjustable scale marks and fixed scale marks when the radar system is additionally provided with apparatus to produce nonadjustable calibrating distance scale marks on the display device.

In order to maintain the error as small as possible, it is conventional to avoid sweeping through the entire display range of the radar system in a single traverse, and rather to operate the analog scale mark generator together with the display device within selected distance ranges. However, even in this case, though the error is reduced, it is not eliminated. The disturbing differences between the adjustable and fixed scale marks continues to remain.

SUMMARY OF THE INVENTION

An object of the present invention, therefore, it to provide apparatus of the type described above which can produce both the fixed and the adjustable distance reference marks with exactly the same scale so as to eliminate the annoying deviations between the positions of these two distance displays.

This object, as well as other objects which will become apparent in the discussion that follows, is achieved, according to the present invention, by constructing the time delay pulse source as a pulse generator for producing timing pulses; a pulse counter for counting the timing pulses and producing a digital output indicative of the count; and a preselector, connected to receive the digital output, for producing a marking pulse each time the counter reaches a particular preselected count.

It is convenient if the preselector is provided with a digital indicator for displaying the preselected count.

Accordingly, when the preselected count is reached, the resulting marking pulse will gate the display device to display a mark indicative of a particular preselected distance. Since the timing pulses from the generator as well as the pulse counter can also be employed to produce the fixed distance reference marks, deviations between the fixed and the adjustable distance marks can be eliminated. The magnitude of error in the distance display will consequently only depend upon the accuracy of the timing pulse generator which can be stabilized to within any desired degree of accuracy using techniques already known in the art. As an example, the timing pulse generator can be stabilized by means of a quartz crystal.

According to one preferred embodiment of the present invention, both the timing pulse generator and the transmitter of the position-finding system can be simultaneously gated by a control device to provide the desired synchronous operation. According to another preferred embodiment of the present invention, the timing pulse generator is allowed to operate continuously. The transmitter is synchronized by means of a counter which periodically gates the transmission of a beam upon receipt from the pulse generator of each $n$th timing pulse.

According to a third preferred embodiment of the synchronizing circuit according to the present invention, there is provided a primary pulse generator which produces primary timing pulses with a period that is a whole-numbered fraction of the period of the timing pulses ultimately used to define a unit of distance. These primary timing pulses are supplied to a digital counter through a gate which is opened by a pulse from a synchronizing control device. After $m$ primary pulses have been received by the digital counter, the same produces the ultimate timing pulses.

DESCRIPTION OF THE PREFERRED EMBODIMENTS

Figure 1:
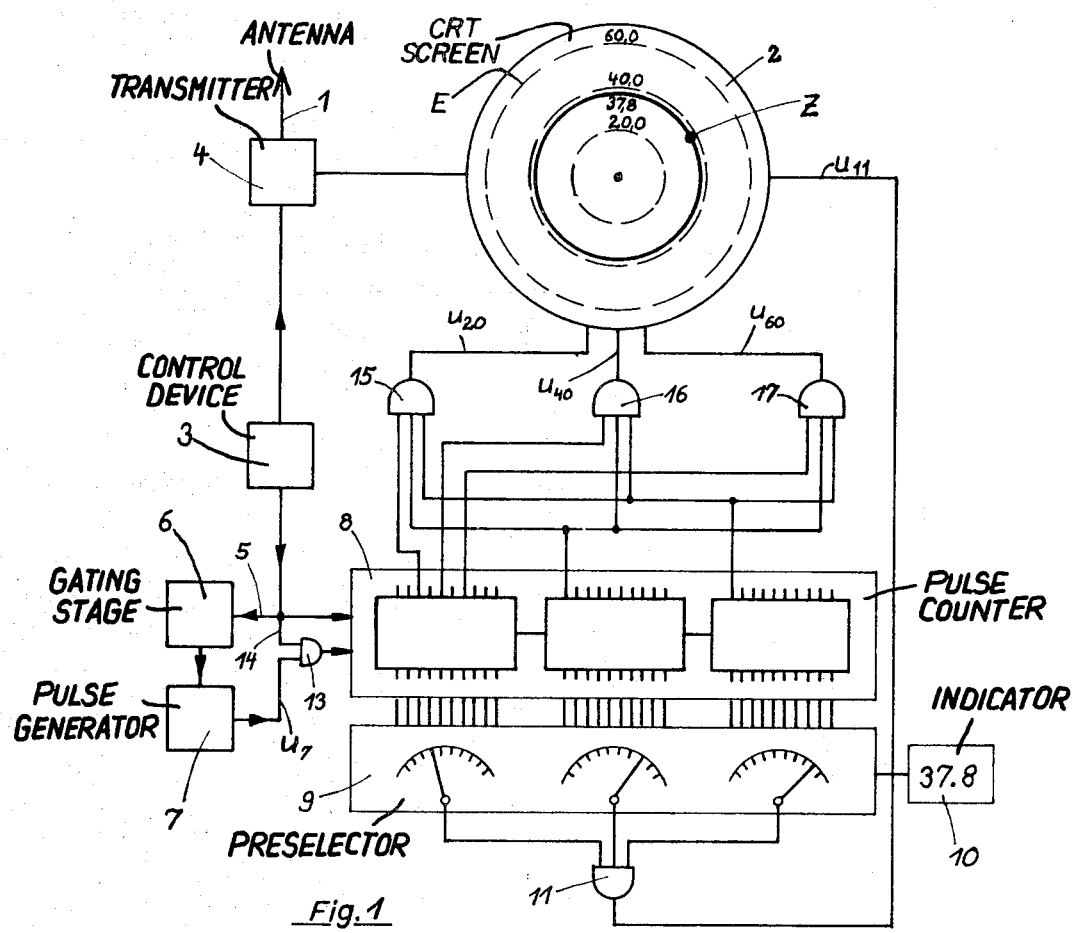
FIG. 1 is a block diagram of apparatus according to a preferred embodiment of the present invention for producing one adjustable and several fixed distance scale marks on the screen of the cathode-ray tube display device of a reflected beam position-finding system.

The preferred embodiment of the present invention will now be described in connection with FIGS. 1 to 3 of the drawings. FIG. 1 of the drawing illustrates one preferred embodiment of apparatus for producing both an adjustable and several fixed distance reference marks on the screen of the display device of a radar system. The radar system is provided with a single antenna 1 which serves to transmit the outgoing radar beam pulses as well as to receive the reflected beam pulses. The antenna 1 continuously rotates about a vertical axis in order to scan the entire surrounding region. The received reflected beam pulses are employed in the conventional manner to produce a display on a display device; for example, on the screen 2 of a cathode-ray tube. The cathode-ray tube is provided with a deflection system which rotates in synchronism with the rotation of the antenna so that the angular position of the echoes displayed on the screen will correspond to the bearing of the reflecting objects or targets. The beam of the cathode-ray tube will also be deflected in the radial direction in synchronism with the transmitted radar beam pulses, e.g., by a sawtooth generator, so that the distance from the center of the screen to the echoes displayed thereon will correspond to the distance of the reflecting objects. Such a display is known in the art as a "plan position display".

In the embodiment illustrated in FIG. 1, gate pulses are generated in a control device 3 and employed in the conventional manner to control the transmitter 4. These gate pulses are also sent through a line 5 to a gating stage 6 which controls a pulse generator 7 that produces timing pulses $u_7$. The period between these timing pulses $u_7$ corresponds timewise to the smallest unit of distance to be measured; for example 0.1 nautical miles or 0.1 kilometers.

The gating stage 6 delivers the necessary control voltage to the pulse generator and contains the delay device to adjust the correct time relation between the transmitted pulse and the timing pulses as is conventional in the art.

By counting the timing pulses $u_7$ in a suitable pulse counter 8, it is possible to generate a pulse for producing scale marks indicative of any desired distance in steps which correspond to the smallest unit of distance to be measured. These distance scale marks will be repeatedly generated with every sounding period so that in the course of one or more revolutions of the cathode-ray beam the individual marks will produce a distance scale ring E on the screen 2.

The position or diameter of the distance scale ring E is controlled by producing a marking pulse when the pulse counter 8 reaches a preselected count. This preselection is effected by a digital preselector 9. Assuming, for example, that an object Z is noted on the screen of the cathode-ray tube at a distance between 20.0 and 40.0 natical miles, its distance can be exactly determined by adjusting the preselector 9 until the distance ring E so produced passes through the luminous point representing the object Z. This adjusted distance may then be read from a digital indicator 10 which is coupled with the preselector 9 to display the selected distance.

As is shown in FIG. 1, the preselector 9 is connected to receive signals from each of the decade stages of the pulse counter 8 and to pass only one signal from each decade stage to an AND-gate 11. When the decades of the pulse counter 8 are each in a state selected by the preselector 9, a signal will be present at all the inputs of the AND-gate 11 causing this gate to generate a pulse $u_{11}$. This pulse $u_{11}$ is employed in the conventional manner to gate the beam of the cathode-ray tube and therefore produce a point of light, or scale mark, on the screen 2.

The timing pulse generator 7 is also employed to produce fixed distance scale or calibration marks on the screen of the cathode-ray tube, for example at the distances 20.0, 40.0 and 60.0 nautical miles in the 60-mile range as shown in FIG. 1. The use of this common pulse generator 7 ensures that the scale for the fixed and for the adjustable distance reference marks, which form the distance rings E, will coincide.

In the embodiment shown in FIG. 1, the timing pulses $u_7$ are passed through an AND-gate 13 to the first decade of the pulse counter 8 as soon as the gate 13 is opened by a gating pulse applied to its input line 14 by the control device 3. The leading edge of this gating pulse appears at the moment when the transmitter 4 sends out a beam on the antenna 1. The marking pulses $u_{20}$, $u_{40}$ and $u_{60}$ which produce the fixed scale marks on the cathode-ray tube screen are generated in a manner identical to the adjustable scale marking pulse $u_{11}$ by connecting the inputs of respective AND-gates 15, 16 and 17 to suitable decade terminals of the pulse counter 8.

With the illustrated counter it is possible to sweep the entire distance range. In contrast to the analog methods used in the prior art, it is unnecessary to switch to various ranges of measurements (e.g., from 0 to 20.0 nautical miles or from 0 to 60.0 nautical miles) to reduce the error.

Since the period of the timing pulses $u_7$ corresponds to the smallest unit of the distance to be measured (e.g., 0.1 nautical miles), means must be provided to ensure synchronism between the timing pulses $u_7$ and the transmitted pulses of the radar system. In the first embodiment of the present invention, illustrated in FIG. 1, this synchronism is achieved by gating the timing pulse generator 7 through the gating stage 6.

Figures 2, 3:
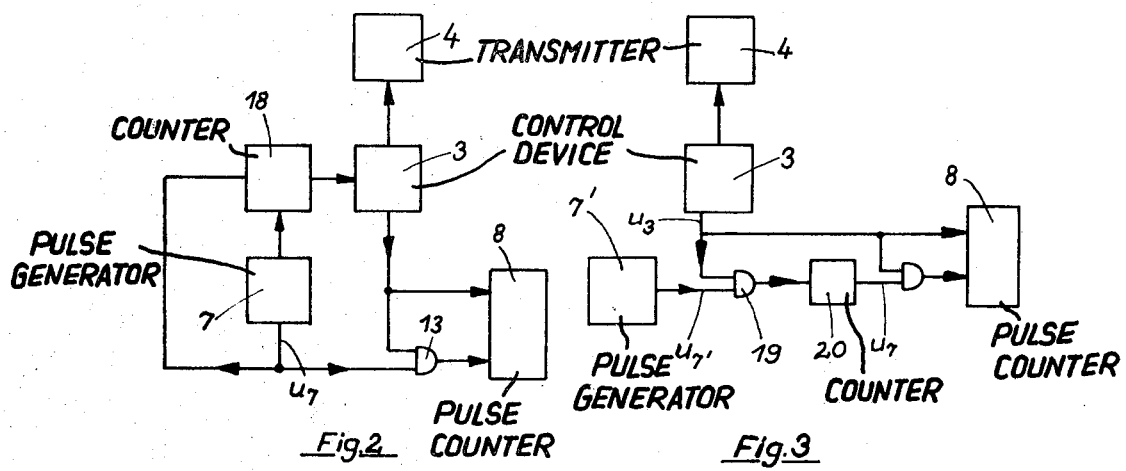
FIG. 2 is a block diagram of a modified synchronizing circuit which may be used in the apparatus of FIG. 1.
FIG. 3 is a block diagram of another modified synchronizing circuit which may be used in the apparatus of FIG. 1.

FIG. 2 illustrates a second preferred embodiment of this synchronizing circuit which may be employed in the apparatus of FIG. 1. In this embodiment the pulses produced in the control device 3 are synchronized by a counter 18 which produces an output control pulse upon receipt of a given number (n) of the timing pulses $u_7$ from the continuously running timing pulse generator 7.

FIG. 3 shows still another embodiment of a synchronizing circuit which may be employed in the apparatus of FIG. 1. This circuit is provided with a primary timing pulse generator 7' which produces primary timing pulses $u_7$, with a period which is a whole numbered fraction of the period of the timing pulses $u_7$; that is, a fraction of the period corresponding to the smallest unit of the distance to be measured. These primary timing pulses $u_7$, are applied in quick succession to an AND-gate 19 which is opened by a gating pulse $u_3$ produced by a control device 3. The pulses $u_7$, which pass through the AND-gate 19 are repeatedly counted by a digital counter 20. This counter 20 produces the timing pulse $u_7$ that serves as the timing pulse for the distance determination, after a prescribed number of pulses $u_7$, have been received.

In each of the embodiments illustrated in FIGS. 1, 2 and 3 the pulse counter 8 is cleared (reset to zero) at the end of the display time by the gating pulse or its trailing edge produced by the control device 3.

It will be understood that the above description of the present invention is susceptible to various modifications, changes and adaptations. In particular, the present invention is not limited to use in radar systems but can also be employed, for example, with sonar systems which operate with underwater sound.

I claim:

1. Apparatus for simultaneously producing fixed distance reference marks and an adjustable distance reference mark on the display device of a reflected beam position-finding system, comprising, in combination:

pulse generator means for producing timing pulses spaced with a period equal at most to the smallest time interval which is to be adjusted;

pulse counter means, connected to the output of said generator means, for counting said timing pulses and producing a digital output indicative of the count in said counter means;

means for causing said pulse counter means to begin counting said timing pulses when said position-finding system transmits a beam pulse;

adjustable preselector means, connected to said counter means for producing a first marking pulse each time said counter means produces a digital output indicative of a particular, preselected count;

means, connected to said pulse counter means, for producing second marking pulses each time said counter means produces a digital output indicative of preset fixed counts of said timing pulses; and means connecting the outputs of said preselector means and said second marking pulses producing means to said display device for causing said display device to display a mark in response to each of said first and second marking pulses whereby the mark displayed in response to said first marking pulse is indicative of a particular adjustable preselected distance and the marks displayed in response to said second marking pulses are indicative of particular fixed distances.

2. The apparatus defined in claim 1, wherein said preselector means includes digital indicator means for displaying said preselected count.

3. The apparatus defined in claim 1, wherein said means for causing said pulse counter to begin counting comprises means, connected to said pulse generator means, for starting said pulse generator means each time said position-finding system transmits a beam pulse.

4. The apparatus defined in claim 3, wherein said position-finding system includes a transmitter means, connected to said starting means, for transmitting the beam pulses and wherein said starting means synchronously gates said transmitter means and said pulse generator means.

5. The apparatus defined in claim 1, wherein said position-finding system includes a transmitter means for transmitting the beam pulses, and wherein said means for causing said counter means to begin counting comprises a second pulse counter means, connected to said pulse generator means and to said transmitter means, for synchronously gating said transmitter means upon receipt of the $n$th timing pulse from said pulse generator means.

6. The apparatus defined in claim 1, wherein said timing pulses are spaced with a period corresponding to the smallest unit of distance to be displayed on said display device.

7. The apparatus defined in claim 1, wherein said pulse generator means includes:

1. a primary pulse source means for producing primary pulses spaced with a period substantially smaller than said period of said timing pulses;

2. gating means, connected to said primary pulse source means, for passing said primary pulses upon receipt of a gating pulse; and 3. third pulse counter means, connected to said gating means, for producing said timing pulses upon receipt of the $m$th primary pulse from said gating means.

8. The apparatus defined in claim 7, wherein said position finding system includes a transmitter means for transmitting the beam pulses, and wherein said means for causing said counter means to begin counting comprises control means, connected to said transmitter means and to said gating means, for synchronously gating said transmitter means and said gating means.

* * * * *